US006381541B1

(12) United States Patent
Sadler

(10) Patent No.: US 6,381,541 B1
(45) Date of Patent: Apr. 30, 2002

(54) AIRPLANE GROUND LOCATION METHODS AND SYSTEMS

(76) Inventor: Lance Richard Sadler, 2014 E. Westminster La., Spokane, WA (US) 99223

( * ) Notice: Subject to any disclaimer, the term of this patent is extended or adjusted under 35 U.S.C. 154(b) by 0 days.

(21) Appl. No.: 09/707,329

(22) Filed: Nov. 6, 2000

(51) Int. Cl.[7] .......... G06F 17/10

(52) U.S. Cl. .......... 701/301; 701/300

(58) Field of Search .......... 701/301, 300, 701/120, 122; 340/945, 958, 959, 960, 961, 962, 982, 933; 342/29, 32, 36

(56) References Cited

U.S. PATENT DOCUMENTS 4,516,125 A 5/1985 Schwab et al. .......... 343/7.7
5,508,697 A 4/1996 Kato et al. .......... 340/933
6,038,502 A * 3/2000 Sado .......... 701/301
6,081,764 A * 6/2000 Varon .......... 701/300
6,252,525 B1 * 6/2001 Philiben .......... 340/961

* cited by examiner

*Primary Examiner*—Richard M. Camby
(74) *Attorney, Agent, or Firm*—Lance R. Sadler

(57) ABSTRACT

Airplane ground location methods and systems are described. In one embodiment, a ground location evaluator includes one or more interrogators. Individual interrogators are configured to receive wireless communication from multiple airplanes that are located on the ground at an airfield. Multiple location transmitters or transceivers are provided and each is mounted on an airplane. Individual location transmitters or transceivers are configured to wirelessly communicate with the one or more interrogators. The ground location evaluator is configured to process the wireless communication to ascertain the location of communicating airplanes and responsive thereto, determine whether there is a likelihood of a runway incursion.

19 Claims, 11 Drawing Sheets

| | Condition | Remedial Measure |
|---|---|---|
| 800 | Approach Window = TRUE<br>Forbidden Location = TRUE | Issue "go around" command |
| 802 | Landing Window = TRUE<br>Forbidden Location = TRUE | 1. Issue "clear active" command<br>2. Issue "clear active" and "go around" commands |
| 804 | Takeoff Window = TRUE<br>Forbidden WIndow = TRUE | 1. Delay takeoff and issue "clear active" command<br>2. Abort takeoff and issue "clear active" command |

Fig. 8

AIRPLANE GROUND LOCATION METHODS AND SYSTEMS

TECHNICAL FIELD

This invention relates to runway collisions avoidance systems, and more particularly, to systems and methods for detecting the presence and location of aircraft on the ground on and near airport runways.

BACKGROUND

In 1991, a commuter plane taxied onto a runway that was supposed to be clear for landings. In the maze of planes, controllers didn't see it and neither did the pilot of an incoming jetliner. The two planes collided in a sea of crunching metal. In January of 1997, a DC-9 that was cleared to land at Cleveland-Hopkins International Airport on runway 5R noticed a commuter plane taxi into it path. The pilot of the DC-9 was able, just in time, to abort the landing and avoid colliding with the commuter plane. That near miss, known in aviation language as a "runway incursion", was caused by simple pilot confusion. The commuter's pilot had become confused, taken a wrong turn, and strayed onto the wrong runway. In the Fall of 2000, a Singapore Airlines jumbo jet crashed in Taipei during a heavy rainstorm. The plane had apparently tried to take off on the wrong runway and slammed into construction equipment being used to repair the strip. The jetliner crashed killing 81 of the 179 people aboard Flight SQ006 from Taipei to Los Angeles.

These are just three examples of a large number of runway incursions that happen every year. In two instances, the incursion was deadly, in another, loss of life was avoided only because of a pilot's alert reaction.

One additional variable that adds to the possibility of a runway incursion is the visibility at the time of the incursions. Specifically, rain and fog can obscure pilot visibility thus increasing the chance of a mishap on the ground. Human factors can also contribute to ground mishaps. For example, perhaps an air traffic controller inadvertently gives erroneous instructions to a pilot, or, perhaps a pilot misunderstands the instructions or takes a wrong turn.

Whatever the cause, the potential loss of life due to runway incursions is huge. Such incursions are potentially devastating because of the numbers of passengers involved—two sets of passengers, one from each plane. During the late 1990's, runway incursions increased some 50%, according to at least one source. The problem of runway incursions will necessarily continue grow as air traffic in airports is expected to double in the coming years.

Accordingly, this invention arose out of concerns associated with providing systems and methods for detecting the presence of and locating aircraft on the ground at airports.

SUMMARY

Airplane ground location methods and systems are described. In one embodiment, a ground location evaluator includes one or more interrogators. Individual interrogators are configured to receive wireless communication from multiple airplanes that are located on the ground at an airfield. Multiple location transmitters or transceivers are provided and each is mounted on an airplane. Individual location transmitters or transceivers are configured to wirelessly communicate with the one or more interrogators. The ground location evaluator is configured to process the wireless communication to ascertain the location of communicating airplanes and responsive thereto, determine whether there is a likelihood of a runway incursion.

BRIEF DESCRIPTION OF THE DRAWINGS

FIG. 8 is a table that describes one aspect of one or more described embodiments.

DETAILED DESCRIPTION

Exemplary Airport Facility

Figure 1:
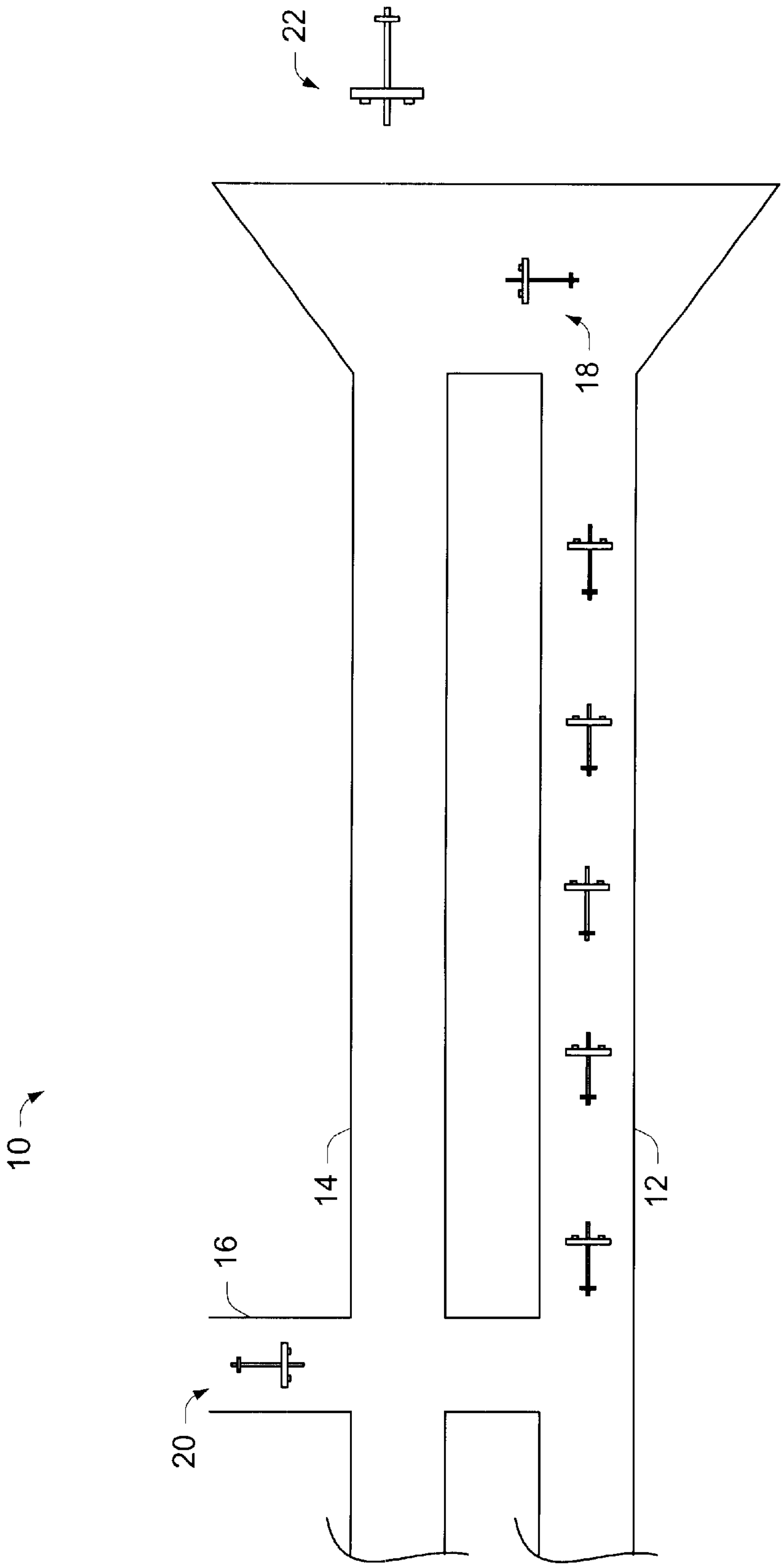
FIG. 1 is an overhead view of an exemplary airfield in which the described embodiments can be employed.

FIG. 1 shows an exemplary airport facility 10 that includes a taxiway 12, an active runway 14 and an entry/exit way 16 through which planes can ingress and egress the taxiway or active runway. In the present example, a number of planes (undesignated) are lined up on taxiway 12, with one plane 18 waiting on the so-called hammerhead to take the active runway for takeoff. Another plane 20 is waiting on entry/exit way 16 to cross over to the taxiway 12. A plane 22 is shown "on approach" and is about to land. Typically, in this situation, all of the planes will hold their position until plane 22 has landed and proceeded to a position where movement of the other planes can resume. This, however, is not always the case. Sometimes, a pilot, because of confusion, poor visibility, erroneous instructions and the like, will venture into an area where they should not be. This can have disastrous consequences as in the case of the Singapore Airliner mentioned in the "Background" section.

Figure 2:
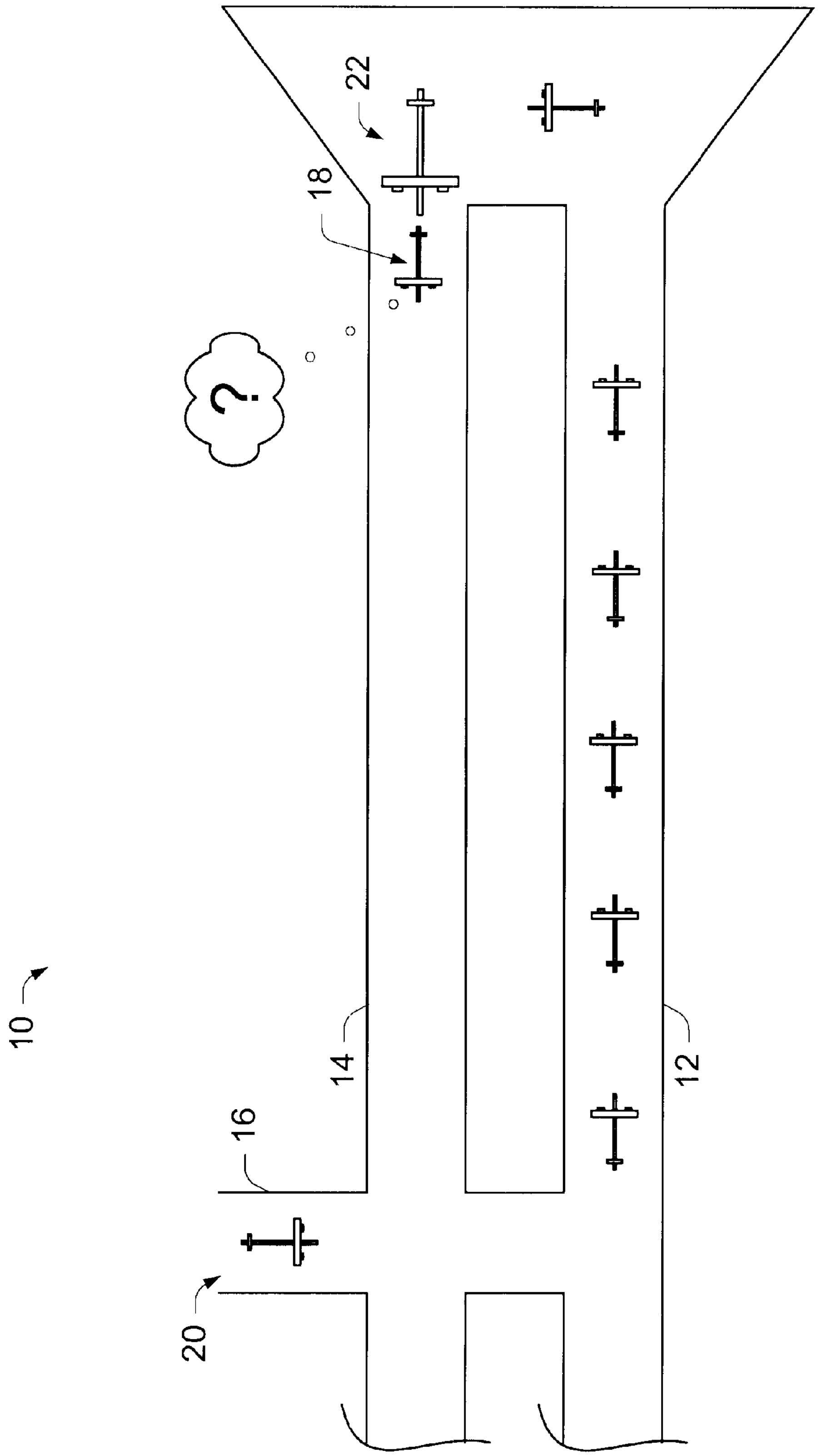
FIG. 2 is an overhead view of an exemplary airfield in which the described embodiments can be employed.

As an example, consider FIG. 2. There, plane 18 has ventured onto the active runway 14 before plane 22 has been able to land. If the pilot of plane 22 does not visually see plane 18 blocking its path and take corrective action at the right time, a collision will likely occur.

Air traffic controllers typically move aircraft around by giving instructions on where the aircraft should proceed and when. Thus, the air traffic controller would typically tell the pilot of airplane 18 when it was time to take the active runway. If, however, the pilot of airplane 18 or, one of the airplanes waiting on the entry/exit way becomes disoriented, they can fail to follow the controller's directions thus leading to disaster.

Exemplary Ground Location System

Figure 3:
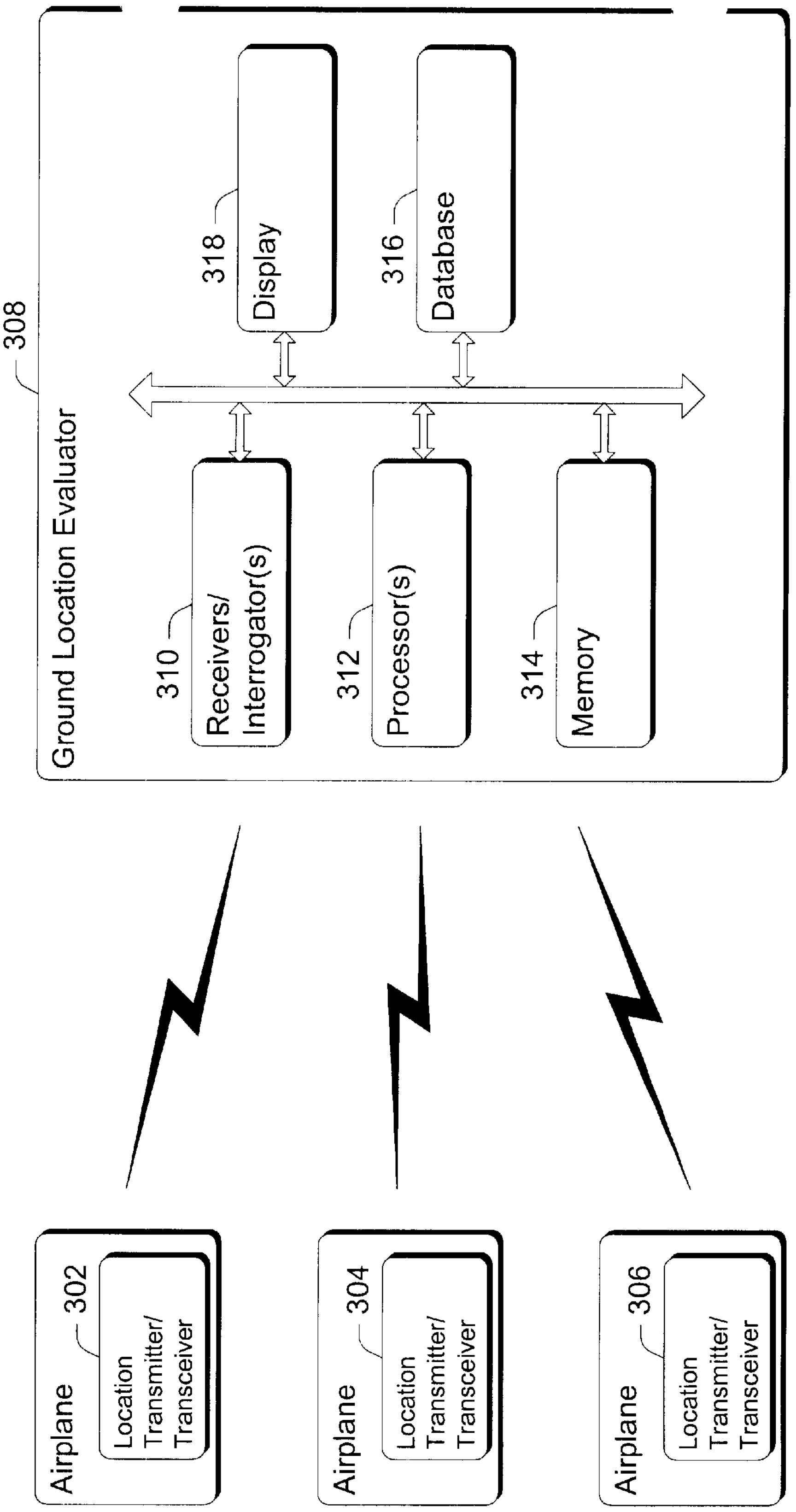
FIG. 3 is a block diagram of an exemplary system in accordance with one described embodiment.

FIG. 3 shows a high level view of a ground location system generally at 300 in accordance with one embodiment and includes one or more location transmitters or transceivers 302–306, and a ground location evaluator 308. In the illustrated example, location transmitters or transceivers 302–306 are shown to be mounted on, other otherwise incorporated in airplanes. Ground location evaluator 308 includes, in this example, one or more receivers or interrogators 310 that are configured to either or both of receive communication from one or more of the location transmitters or transceivers 302–306, or send and receive communication from the location transmitters or transceivers. Evaluator 308 also includes one or more processors 312, e.g. microprocessors, memory 314, a database 316, and one or more displays 318. All of these components can be operably coupled together for communication via a suitable bus (not specifically designated).

In one embodiment, aspects of the methods that are described below are implemented, at least in part, by software modules or programs stored in memory 314 and executable on processor(s) 312. To this extent, the invention includes all forms of computer-readable media that can contain instructions thereon which, can executed by one or more processors. Such media includes, without limitation, ROM, RAM, CD ROMs, floppy disks, and the like.

Each location transmitters or transceiver is preferably able to wirelessly communicate with the ground location evaluator 308 and can provide information as to its location on the ground about the area of the airport, or information that can be used by the ground location evaluator 308 to derive an accurate location. Each location transmitters or transceiver can have a unique ID so that the location evaluator 308 knows which entity (e.g. aircraft) is sending the communication.

Any suitable type of transmitter, transponder or transceiver can be used to implement location transmitters or transceivers 302–306.

For example, each location transceiver 302 can include circuitry such as described in U.S. Pat. Nos. 5,914,671, 6,101,375, 6,097,301, 6,078,791, 6,045,652, 6,024,285, 6,013,949, 5,983,363, and 5,974,078 and incorporated herein by reference. The devices 302–306 can be implemented as intelligent radio frequency identification devices or remote intelligent communications (RIC) devices which communicate at microwave frequencies.

Figure 4:
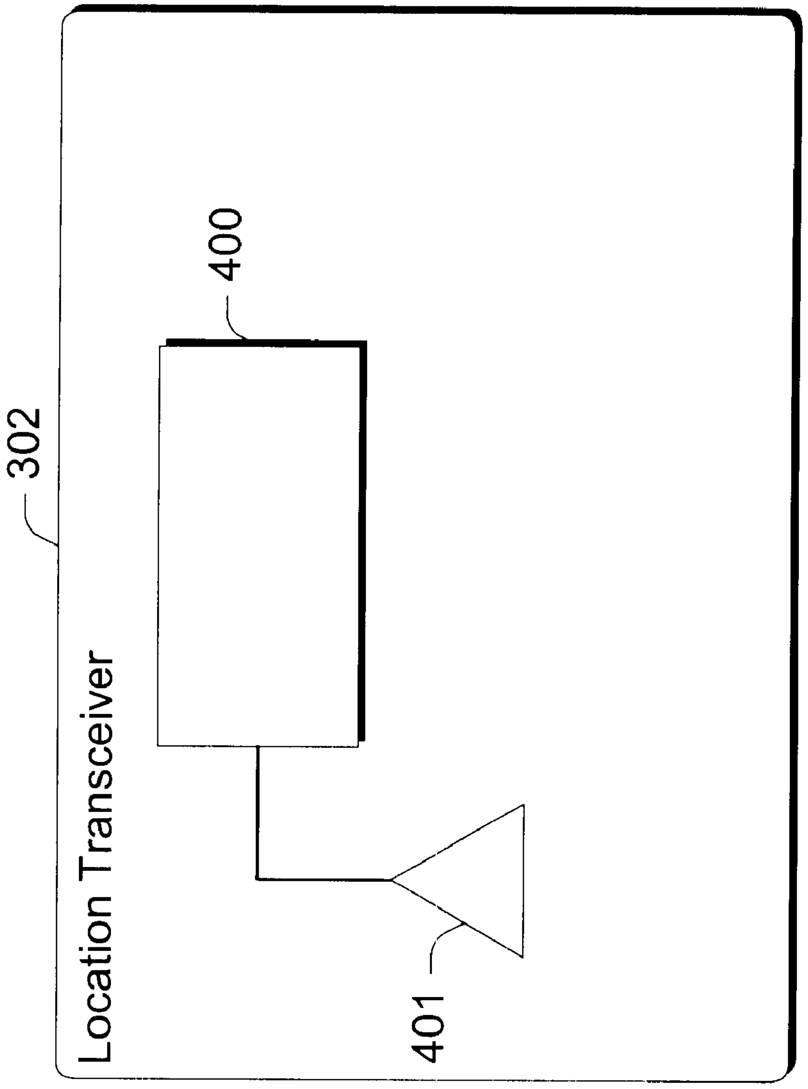
FIG. 4 is a block diagram of an exemplary location transceiver that can be utilized in connection with one or more described embodiments.

FIG. 4 shows but one example of a device 302, in the form of an intelligent radio frequency identification device integrated circuit 400. The integrated circuit 400 includes a transmitter, a receiver, a microprocessor, and a memory. The housing for the device 302 shown in FIG. 4 can be any suitable housing made of any suitable material. The device 302 further includes a send/receive antenna 401 coupled to the integrated circuit 400. Any suitable antenna can be used. Exemplary antennas are described in one or more of the U.S. Patents incorporated by reference above. Each device 302 can be powered by a power source that is on-board the vehicle on which it is mounted. Alternately, the device 302 can be battery powered. Examples of suitable battery powered devices are described in U.S. Pat. No. 5,914,671, the disclosure of which is incorporated by reference.

In principle, transmitters on each airplane, whether implemented as transmitters, transceivers or the like, are able to provide information or data pertaining to their location about the runway. This information is electronically received by the ground location evaluator 308 (FIG. 3) which then makes database entries for each of the airplanes and analyzes the plane locations to ascertain whether there is a likelihood of a runway incursion. The ground location evaluator is also provided with information as to the status of various inbound planes so that it can incorporate those statuses into its evaluation, as will become apparent below. The transmitter on each plane can be configured to provide its information periodically, at regular intervals so that the ground location evaluator can continually monitor the ground state or location of each of the planes. Additionally, to visually assist the air traffic controllers, a display (318) can be provided in the control tower to indicate the location of various planes that are being tracked by the system. This way, air traffic controllers can ascertain, at a glance, where a potential incursion has been identified by the system. This display can advantageously be a real time display that is continually updated as the status or locations of the ground-tracked planes changes.

Forbidden and Allowed Locations

Figure 5:
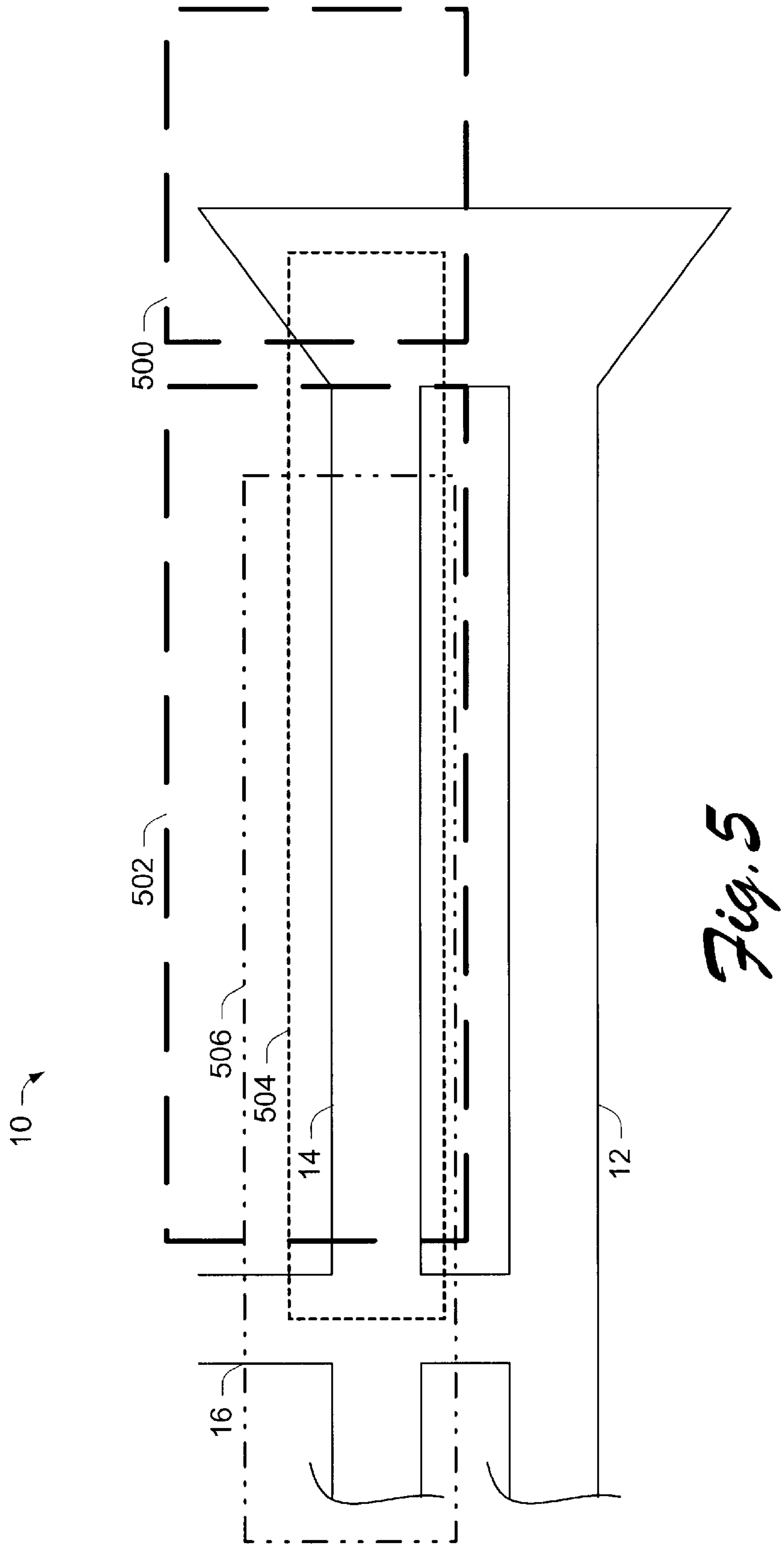
FIG. 5 is an overhead view of an exemplary airfield in which the described embodiments can be employed.

In one embodiment, the concept of forbidden and allowed locations is utilized. A forbidden location is a location which, as computed by processor 312 and for a given airfield state, has a high degree of likelihood of experiencing a runway incursion. An allowed location is a location in which, for a given airfield state, there is little or no likelihood of experiencing a runway incursion. For each plane having a location transmitter or transceiver, the information that is received by the ground location evaluator 308 is processed and a determination is made as to whether the airplane is in a forbidden or allowed location. If a airplane is in a forbidden location, preventative measures can be taken. Examples of this are given below. Consider for example FIG. 5 which shows a runway in which various so-called windows, forbidden locations and allowed location have been designated. Consider also that there are typically two periods of time when runway incursions are likely—on landing and on take off. For each designated window there are associated forbidden and allowed locations on the runway. If a subject plane enters a particular designated window and another plane happens to be positioned within a forbidden location for that window, then preventative measures can be taken.

As an example and in accordance with one embodiment, consider the following: When a plane is on approach to land, various windows are defined that can, at any one time, contain the subject plane. As an example consider an approach window 500 and a landing window 502. When a plane enters the approach window 500 it is still in the air and is slated to land in a short period of time. The approach window 500 might extend from the hammerhead to ¼ mile out. When the approach window is occupied by a plane on approach, a forbidden location 504 is defined and in which no other planes are allowed to be located. The illustrated forbidden location can extend from the hammerhead down the runway for any suitable distance. In a very conservative implementation, the forbidden location can extend the entire length of the runway so that when a plane is within the approach window 500, no other planes are allowed within the forbidden location 504. Alternately, the forbidden location 504 can be defined to allow other planes to cross the active runway at some distance down the runway. One of the aspects of the inventive embodiments is that the various windows and forbidden and allowed locations are adjustable to accommodate different airport traffic conditions. For example, in crowded airports the forbidden locations might be adjusted to accommodate movement of the planes on the ground while planes are within the approach window (albeit in a safe manner). In smaller airports where traffic congestion is not a problem or issue, the forbidden locations might be adjusted so that no other planes are allowed to cross an active runway when a plane is within the approach window.

Additionally, landing window 502 can be provided and is defined when a plane has previously been within the approach window 500 on approach but has now touched down. When a plane is within the landing window 502 after having been within the approach window 500, one or more forbidden locations can be defined on the runway. For example, a forbidden location 506 can be defined to run the entire length of the runway when a plane that has just landed is within the landing window 502.

Figure 6:
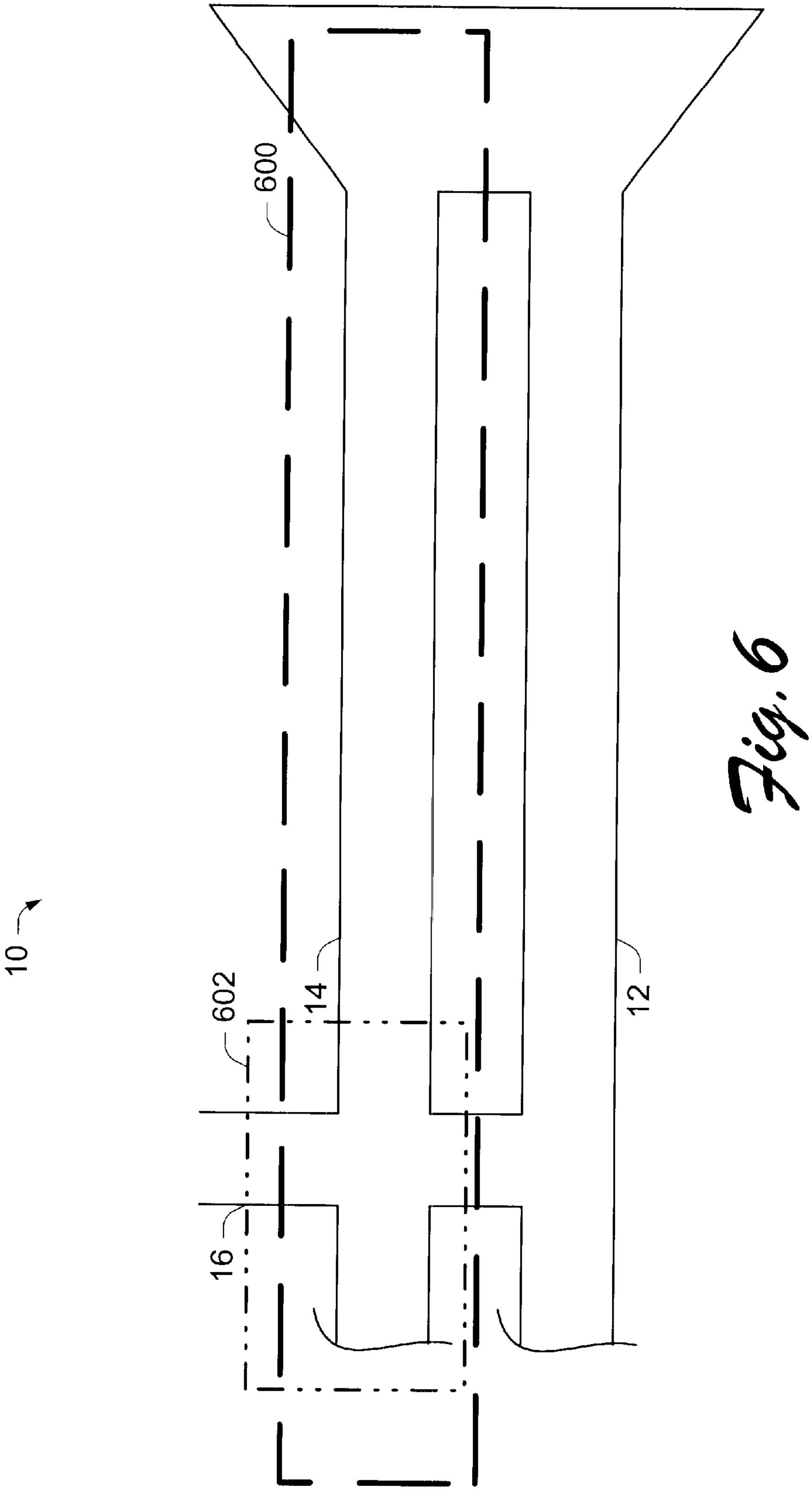
FIG. 6 is an overhead view of an exemplary airfield in which the described embodiments can be employed.

Consider also FIG. 6. There, a takeoff window 600 is defined. The takeoff window is occupied by a plane when it takes the active runway preparing for takeoff. When a plane is within the takeoff window 600, one or more forbidden locations, such as location 602 are defined and within which other planes are not allowed to enter. It should be noted that the takeoff window 600 and the landing window 502 can have portions that coincide. In some implementations, they may even constitute the same window differing in name based only on the state of a plane just prior to entering the window, e.g. if the state of the plane just prior to entering the window was "In the approach window" then the window 600 is the landing window. Alternately, if the state of the plane just prior to entering window 600 was "on the ground", then the window is the takeoff window.

Figure 7:
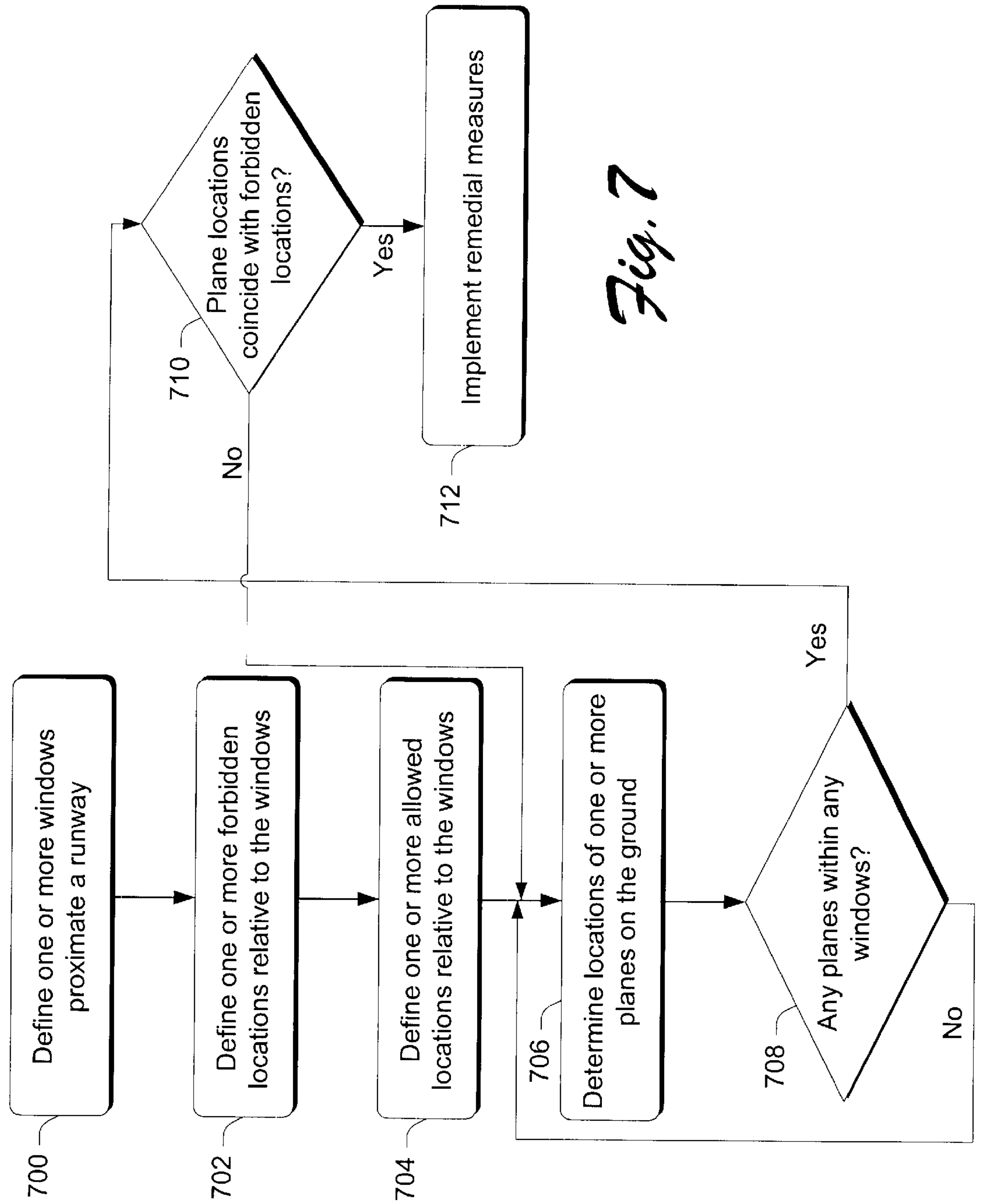
FIG. 7 is a flow diagram that describes steps in a method in accordance with the described embodiment.

FIG. 7 is a flow diagram that described steps in a method in accordance with the described embodiment. The steps in this method can be implemented in any suitable hardware, software, firmware, or combination thereof. In one embodiment, the method is implemented, at least in part, in software.

Step 700 defines one or more windows proximate a runway. Exemplary windows are given above in the form of approach windows, landing windows, and takeoff windows. It is possible, however, to have other windows. For example, windows might be defined at a lower level of granularity, e.g. there may be 2 or more sub-windows within the landing window, or 2 or more windows within the approach window. Step 702 defines one or more forbidden locations relative to the window(s) that are defined in step 700. Step 704 defines one or more allowed locations relative to the window(s) that are defined in step 700. Exemplary forbidden and allowed locations are given above. Step 706 determines the locations of one or more planes on the ground. Examples of how this can be done are given below. It is to be appreciated, however, that any suitable way of determining the locations can be used. The plane locations can be stored in a database, such as database 316 (FIG. 3). Examples of how that can be done are given below. Step 708 determines whether any planes are within any of the defined windows. If there are no planes within the defined windows, the method can branch back to step 706 to again determine the location of the planes on the ground. By looping back to continually determine the locations of the planes on the ground, the method can ensure that at all times steps are being taken to maintain, as accurate as possible, the location of every appropriate plane that is on the ground. If, one the other hand, step 708 determines that there are one or more planes within a window or windows, step 710 determines whether any of the plane locations (determined by step 706) coincide with any of the forbidden locations. If none of the plane locations coincide with a forbidden location, the method branches back to step 706 to determine again the locations of all of the planes. If, however, step 710 determines that a plane location coincides with a forbidden location, then step 712 can implement remedial measures.

Exemplary Remedial Measures

FIG. 8 is a chart the describes exemplary remedial measures that can be implemented when a plane location coincides with a forbidden location and a different plane is within the window associated with that forbidden location.

The first condition that might occur (condition 800) is that the approach window is occupied by a plane on approach, and the forbidden location is occupied by a plane on the ground. In this instance the remedial measure can be to issue a "go around" command to the plane on approach. Accordingly, the plane on approach will not land and there will hopefully be enough time to rectify the situation on the ground. Another condition that can occur is that the landing window can be occupied by a plane while a forbidden location is occupied by another plane (condition 802). In this instance, there might be a couple of different remedial measures that can be implemented depending on the state and location of both planes. A first redial measure will be to issue a "clear active runway" command immediately to the plane that is in the forbidden location. Additionally, if the plane that has entered the landing window just recently entered the landing window, i.e. say its wheels just touched down, a "go around" command can be issued to that plane within the landing window so that it can take off and go around. A third condition that can occur (condition 804) can take place when a plane enters the takeoff window and another plane is within a forbidden location for the takeoff window. In this case, a "clear active runway" command can be immediately issued. Additionally, if the plane that has entered the takeoff window has not yet begun its takeoff roll, the takeoff can be simply delayed until the ground situation is cleared up. If the plane in the takeoff window has just begun its takeoff roll, and it can safely do so, it can abort its takeoff.

Single Interrogator Embodiment

In one embodiment, a single interrogator is provided and can poll, at regular intervals, all of the location transceivers in the appropriate operating environment. The location transceivers receive the interrogation signal and then respond with information that can be used by the ground location evaluator 308 to ascertain the location of all of the appropriate airplanes on which the transceivers are mounted. Alternately, the interrogator can be configured as a passive interrogator (i.e. receiver) in that it simply receives data that is transmitted from each transceiver or transmitter at regular intervals.

Figure 9:
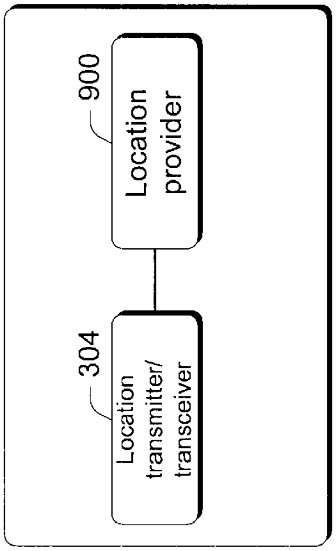
FIG. 9 is a block diagram of an exemplary system in accordance with the described embodiment.

FIG. 9 shows an exemplary system that can be utilized in a passive interrogator embodiment. Location transmitter 304 is coupled with a location provider 900 that is programmed to determine, within a desired degree of precision, the location of the airplane on the ground. Location provider can be any suitable location provider that is capable of providing location information. For example, the location provider might be implemented by a GPS module that is able to triangulate position based upon information received from satellites. Exemplary GPS information is described in U.S. Pat. No. 5,894,266, the disclosure of which is incorporated by reference above. Alternately, other systems can be used. For example, such systems might be tied directly to a plane's navigation instrumentalities.

As the location provider develops information as to its location, transmitter 304 transmits such information to the ground location evaluator 308 (FIG. 3). The ground location evaluator 308 then tracks the plane's location in database 316. As the ground location evaluator 308 receives updates of the plane's location, the database is updated. As information is received from the various planes, processor(s) 312 process the information to ascertain whether there is a likelihood of any ground incursions, as described above.

In another so-called "active interrogator" embodiment, a single interrogator is provided and actively interrogates planes to ascertain their location on the ground. When a location transceiver on a plane is interrogated by the interrogator 310 (FIG. 3), it provides location information based upon the input from the location provider 900 to the ground location evaluator 308, which then processes the information to ascertain whether any problem situations are likely to occur based upon the positions of the other airplanes.

Figure 10:
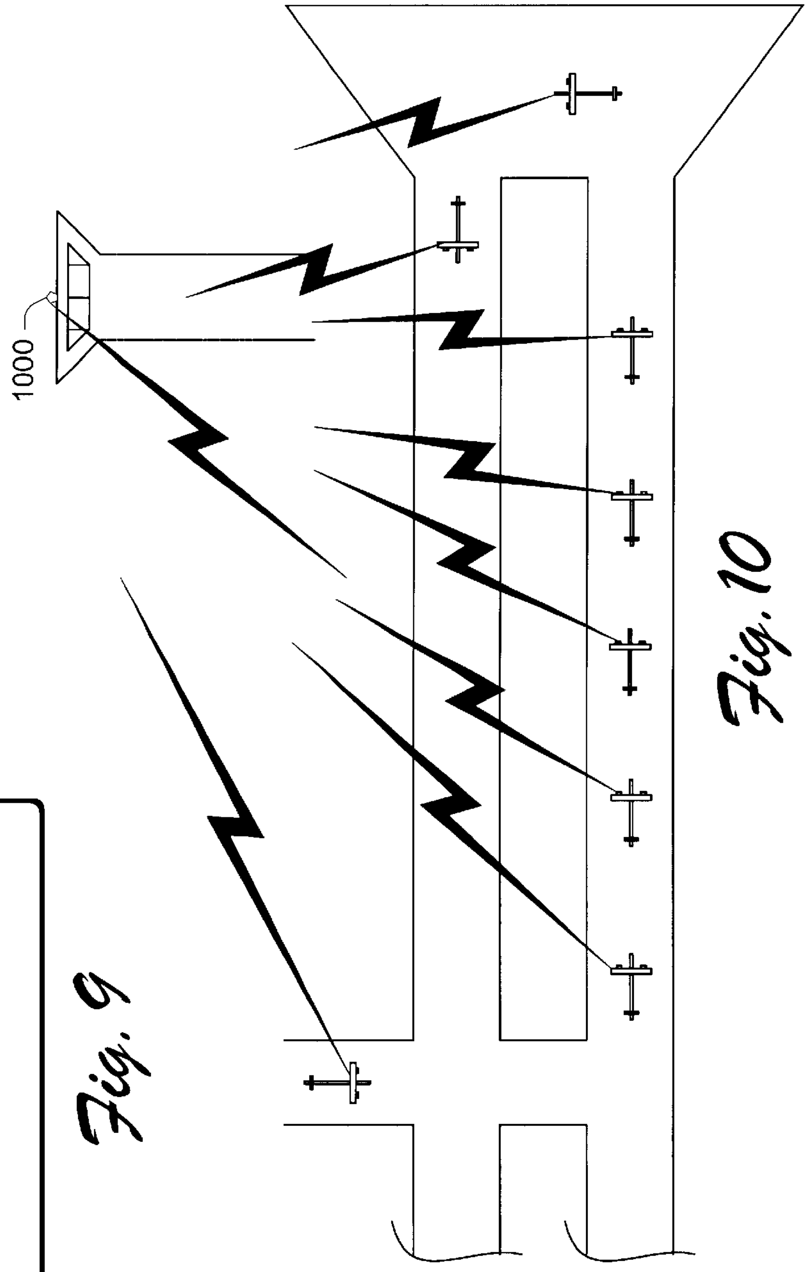
FIG. 10 is an overhead view of an exemplary airfield in which the described embodiments can be employed.

FIG. 10 diagrammatically illustrates a single interrogator embodiment where a single interrogator 1000 is provided in or on the control tower. As the interrogator interrogates the planes on the airfield, each plane answers and transmits its location to the interrogator.

Multiple Interrogator Embodiment

In another embodiment, multiple interrogators are provided, each having zones within which they transmit and receive. The interrogators monitor these zones by continually polling for any planes that may have entered the zone. When a plane enters the zone, its transceiver receives a transmitted signal from the associated interrogator and transmits a reply. The reply can simply only contain a unique identifier associated with that plane. This is because the position of each interrogator is fixed and known. Thus, any plane responding to a particular interrogator must be within the interrogator's polling zone. The interrogators then relay the identifiers of the planes within their zones to the ground location evaluator 308 which can then track the planes as described above.

Figure 11:
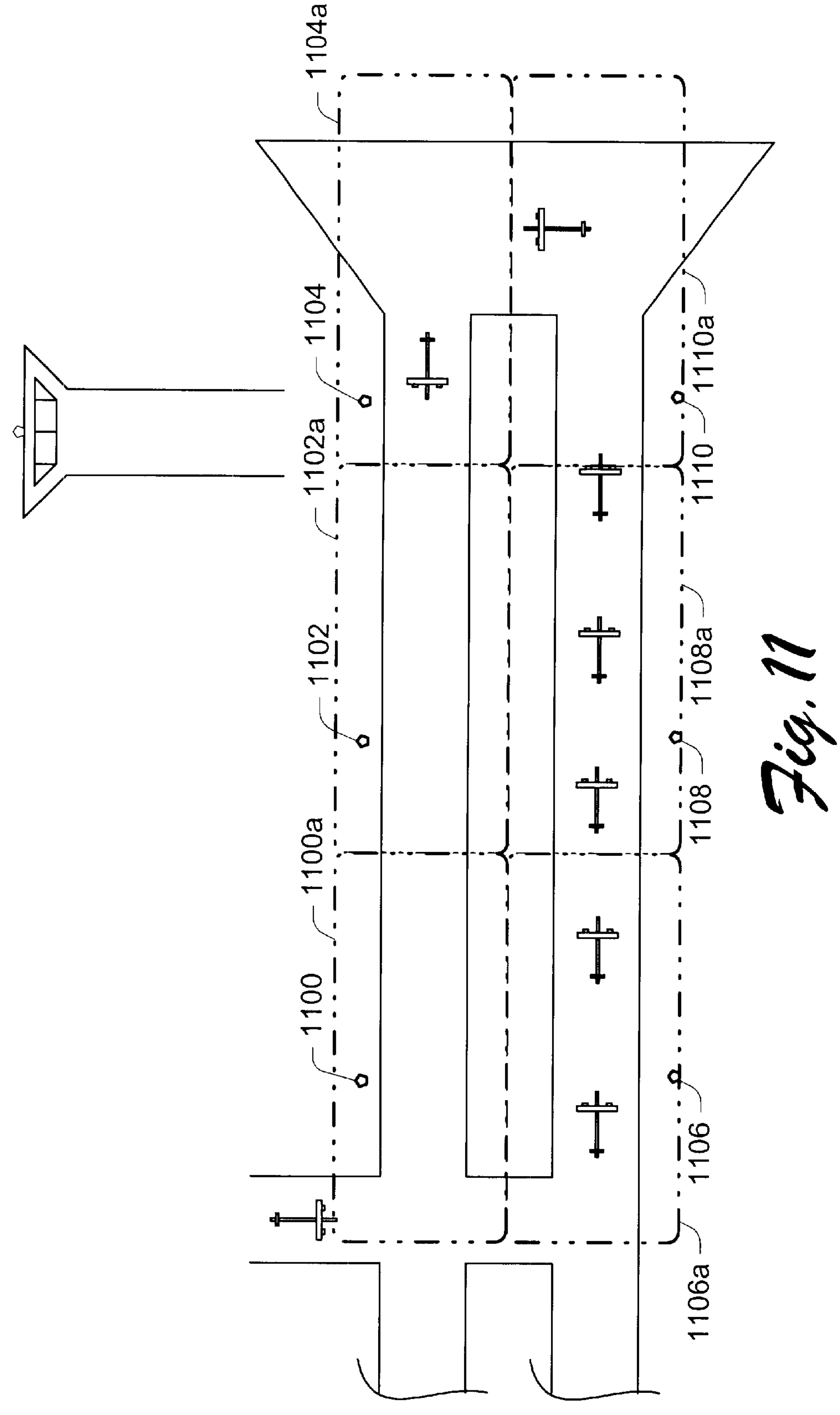
FIG. 11 is an overhead view of an exemplary airfield in which the described embodiments can be employed.

Consider, for example, FIG. 11. There, multiple interrogators 1100–1110 are shown positioned along the active runway and the taxiway. Each of the interrogators can interrogate an area within a defined zone. In this example, the zones are for an interrogator are designated with the suffix "a". Thus, for example, the zone associated with interrogator 1100 is designated at 1100*a*, and so on.

Air Traffic Controller Display

In one embodiment, a visual display is provided in the control tower so that air traffic controllers can immediately ascertain the state of the airfield at a given time. The display is preferably integrated directly with the ground location evaluator 308 (FIG. 3) so that it displays, in a real time manner, the current state of the airfield. The display is preferably a simple, color-coordinated display that can immediately convey the state of the airfield.

Figure 12:
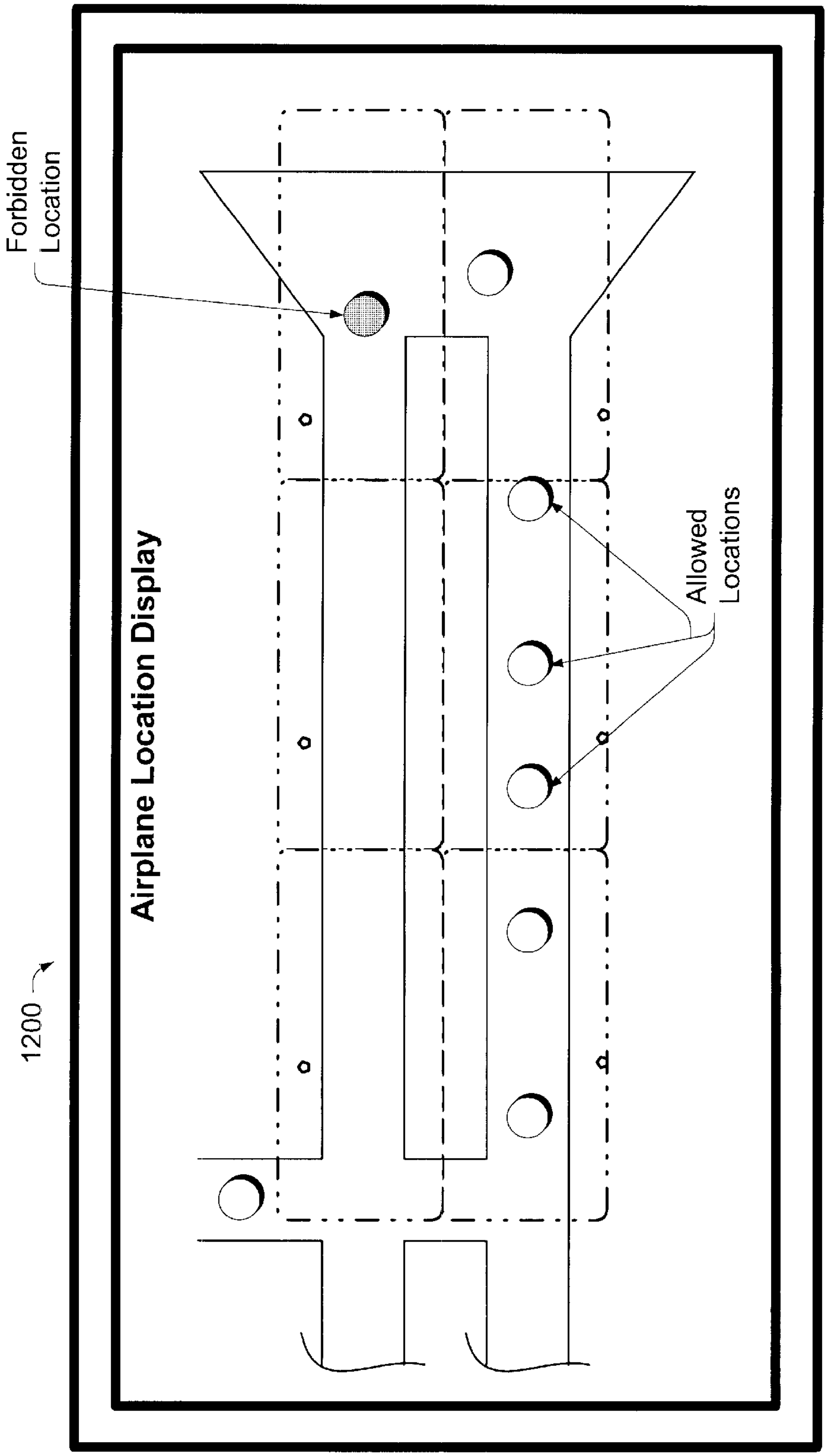
FIG. 12 is a view of an exemplary display that can be provided in accordance with one or more embodiments.

FIG. 12 shows an exemplary display 1200 which is similar in appearance to the layout of the airfield as shown in FIG. 11. Airplanes that are determined to be in allowed locations are displayed as green lights, while airplanes that are determined to be in forbidden locations are displayed as red lights. In the illustrated example, one plane can be seen to be in a forbidden location on the active runway. In this way the system provides a two-fold safety system. First, the automated, electronic tracking system automatically determines the state of the airfield at any given instant in time. It is able, through continuous analysis, to maintain up-to-the-minute information on the locations of airplanes around the airfield. This then supplements an air traffic controller's job of ensuring that ground safety is maintained. The described system can increase response times by greatly reducing the time between when an unsafe condition has occurred and when, in fact, those individuals who need to be notified are notified. Consider, for example, a situation on a foggy night when air traffic controllers have a busy airfield with low visibility. The present system does not depend on visibility in order for it to keep track of the ground location of the airplanes for which it is responsible. When a plane enters a forbidden location for a given airfield state, the controllers can be immediately notified that there is a condition that is likely to lead to a runway incursion if a remedial measure is not put in place. If the controllers were to rely only on their own visibility and the ability of the pilots to accurately communicate their location and not get lost on the runway, it might be too late for any remedial measures to be put in place. The utility of the inventive systems and methods can most recently be appreciated in light of the terrible tragedy of the Singapore Airliner mentioned above. With the present system, regardless of how the pilot came to be situated on the wrong runway, this information would be automatically ascertained at the instant the pilot entered an area where the plane should not be. Second, by providing a simple visual display for the air traffic controllers that quickly and accurately reflects the ground location of all of the airplanes on the airfield, the controllers can not only be nofified of a potential problem, but can easily ascertain, at a glance, where a violation of a forbidden location has occurred. This can greatly increase remedial response times.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An airplane ground location system comprising:

a ground location evaluator having one or more interrogators, individual interrogators being configured to receive wireless communication from multiple airplanes that are located on the ground at an airfield; and multiple location transmitters each of which being mounted on an airplane, individual location transmitters being configured to wirelessly communicate with the one or more interrogators, the ground location evaluator being configured to process the wireless communication to ascertain the location of communicating airplanes and responsive thereto, determine whether there is a likelihood of a runway incursion.

2. The airplane ground location system of claim 1, wherein the transmitters comprise transceivers.

3. The airplane ground location system of claim 2, wherein the one or more interrogators transmit and receive communication to and from the location transceivers.

4. The airplane ground location system of claim 1, wherein the one or more interrogators only receive communication from the transmitters.

5. The airplane ground location system of claim 1 further comprising a database integrated with the ground location evaluator and configured to contain entries that are used to track the locations of airplanes on the ground.

6. The airplane ground location system of claim 1, wherein the transmitters comprise RFID transceivers.

7. The airplane ground location system of claim 1 further comprising a display integrated with the ground location evaluator and configured to visually display the locations of the airplanes on the ground.

8. The airplane ground location system of claim 1, wherein the transmitters comprise transceivers and the one or more interrogators are configured to poll the transceivers for a response which can be used to determine an airplane location.

9. An airplane ground location method comprising:

defining one or more windows proximate an airfield, individual windows defining an area within which an airplane can enter;

defining one or more forbidden ground locations relative to the one or more windows and within which other airplanes are not allowed to be when an airplane is within the one or more windows;

electronically determining ground locations of one or more airplanes at the airfield by receiving and processing wireless communication from the one or more airplanes;

determining whether any airplanes are within any defined windows; and determining whether any other airplanes are in a forbidden location for any airplanes determined to be in the one or more windows.

10. The airplane ground location method of claim 9, wherein said electronically determining comprises polling one or more transceivers, each transceiver being located on an airplane, and receiving a response therefrom.

11. The airplane ground location method of claim 9, wherein said electronically determining comprises polling one or more transceivers from one of a plurality of interrogators positioned around the airfield, each transceiver being located on an airplane, each interrogator having a zone within which it transmits and receives communication.

12. The airplane ground location method of claim 9 further comprising displaying the location of airplanes on the ground on a visual display.

13. The airplane ground location method of claim 12 further comprising updating the visual display responsive to receiving wireless communication from the one or more airplanes.

14. One or more computer-readable media having computer-readable instructions thereon which, when executed by a computer, cause the computer to:

define one or more windows proximate an airfield, individual windows defining an area within which an airplane can enter;

define one or more forbidden ground locations relative to the one or more windows and within which other airplanes are not allowed to be when an airplane is within the one or more windows;

receive electronic communication from multiple different airplanes that are on the ground;

ascertain from the communication a location for each of the airplanes on the ground;

maintain a database having entries that correspond to each of the airplanes and their locations;

determine whether any planes are within any defined windows;

determine whether any other airplanes are in a forbidden location for any airplanes determined to be in the one or more windows; and update the database responsive to electronic communication received from the multiple different airplanes.

15. The computer-readable media of claim 14, wherein the instructions cause the computer to receive electronic communication by causing the computer to poll transceivers on the airplanes.

16. The computer-readable media of claim 14, wherein the instructions cause the computer to receive electronic communication by causing the computer to poll, from a single location, transceivers on the airplanes.

17. The computer-readable media of claim 14, wherein the instructions cause the computer to receive electronic communication by causing the computer to poll, from a multiple locations, transceivers on the airplanes.

18. The computer-readable media of claim 17, wherein the computer polls the airplanes using multiple interrogators each of which has a zone within which it transmits and receives communication.

19. The computer-readable media of claim 14, wherein the instructions cause the computer to display the locations of the airplanes on a visual display.

* * * * *